INVENTOR
FRANZ J. SCHRAMEL
BY
AGENT

INVENTOR
FRANZ J. SCHRAMEL
BY
AGENT

INVENTOR
FRANZ J. SCHRAMEL.
BY Frank R. Trifari
AGENT

Feb. 8, 1966 F. J. SCHRAMEL 3,234,508

DEVICE FOR RENDERING INEFFECTIVE ERRORS OCCURRING IN THE CODE GROUPS WRITTEN ON AN INFORMATION CARRIER BY A WRITER FED FROM A SOURCE OF INFORMATION

Filed Sept. 5, 1961 6 Sheets-Sheet 4

INVENTOR
FRANZ J. SCHRAMEL.

BY Frank R. Trifari
AGENT

INVENTOR
FRANZ J. SCHRAMEL
BY
AGENT

Feb. 8, 1966 F. J. SCHRAMEL 3,234,508

DEVICE FOR RENDERING INEFFECTIVE ERRORS OCCURRING IN THE CODE GROUPS WRITTEN ON AN INFORMATION CARRIER BY A WRITER FED FROM A SOURCE OF INFORMATION

Filed Sept. 5, 1961 6 Sheets-Sheet 6

INVENTOR
FRANZ J. SCHRAMEL
BY
Frank R. Jufari
AGENT 3,234,508
Patented Feb. 8, 1966

3,234,508

DEVICE FOR RENDERING INEFFECTIVE ERRORS OCCURRING IN THE CODE GROUPS WRITTEN ON AN INFORMATION CARRIER BY A WRITER FED FROM A SOURCE OF INFORMATION

Franz Josef Schramel, Hilversum, Netherlands, assignor to North American Philips Company, Inc., New York, N.Y., a corporation of Delaware Filed Sept. 5, 1961, Ser. No. 135,870
Claims priority, application Netherlands, Sept. 6, 1960, 255,641
5 Claims. (Cl. 340—146.1)

The invention relates to a device for rendering ineffective errors occurring in the code groups written by a writer fed from an information source on an information carrier. The code groups, after being provided with the information by the writer, are passed through a reader, which passes the read code groups to a checking circuit connected thereto. The checking circuit produces an error signal, if the read code group contains an error. In the transmission of digital information, termed in America usually data-transmission, it is highly important to arrange the assembly so that any errors occurring in the information transmitted in the form of code groups should be assessable. This may be achieved by using a so-called self-checking code. There are already known telegraph systems, particularly telegraph systems with radio communication, in which a self-checking code is used and in which, as soon as an erroneous code group is detected, the code group last transmitted is repeated. This system provides an effective check and correction of the transmission path, particularly the radio path, in which a comparatively high percentage of errors may be expected. In many cases the incoming information is written by a writer more or less permanently on an information carrier. The writer may, for example, be a tape puncher and the information carrier may be punching tape. As an alternative, the writer may consist of one or more recording heads, in which case the information carrier is a magnetic tape. Therefore, the term "writer" is to be considered here in a broader sense. The invention has particularly for its object to check the writer and to correct errors made thereby. This is particularly important, if the risk of errors on the transmission path and in the writer is of the same order as is the case in the transmission of digital information via a wire or cable, followed by a tape puncher as a writer. There are known tape punchers which are linked to a tape reader, which serves only for checking purposes. This tape reader is then linked to a checking circuit, which produces an error signal, when the read code group contains an error and hence does not come up to the checking characteristics, which may consist, for example in that all code groups should comprise an even (or odd) number of punched holes. The error signal is used in the known devices to produce an alarm signal, to alert the operator to take the necessary steps. The invention has for its object to automate much more and to speed up considerably the checking and the correction of the information carrier supplied by the writer, which need not necessarily be a punching tape. In accordance with the invention the checking circuit is connected via a wire to the information source, the error signal being conducted via the said wire to the information source, which responds to the reception of an error signal by repeating at least the last transmitted $p+2$ code groups, wherein $p$ designates the number of code groups of the portion of the information carrier between the writer and the reader, whilst the checking circuit is furthermore connected to further members (SVL and HS in FIGURES 4 and 5; S in FIGURES 2, 3 and 4) of the device, which members also receive an error signal and respond to the reception thereof by writing a special code group on the information carrier, which special code group contains the information "one step further" for the further processing devices.

The invention will now be described more fully with reference to the drawing.

Figure 1:
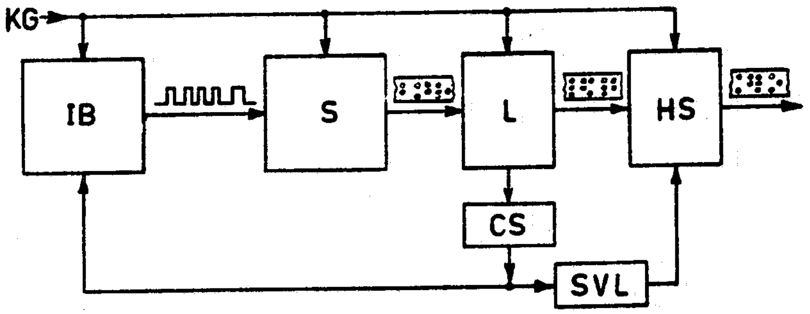
FIGURE 1 shows the block diagram of a first embodiment of the invention.

FIGURE 1 shows the block diagram of a first embodiment of the invention. In this figure IB designates an information source, S a writer, in this case a tape puncher, L a reader (in this case consequently a tape reader), HS an auxiliary writer (in this case an auxiliary tape puncher) CS a checking circuit and SVL a special delay line. The information source IB may be connected via a plurality of wires to the writer S, so that the latter receives the code groups concerned in parallel. The invention is, however, independent of the last-mentioned detail. The information carrier (in this case the punching tape) written by the writer passes in order of succession the reader L and the auxiliary writer HS. The code groups read by the reader are transmitted via a number of wires to the checking circuit CS, which checks the code groups with respect to errors. This requires the use of a self-checking code. When the checking circuit detects an erroneous code group, it transmits an error signal to the information source IB and to the special delay line SVL. The information source IB responds to the reception of the error signal by repeating the last-transmitted $p+2$ code groups, in which $p$ designates the number of code groups on the part of the information carrier between the writer S and the reader L. It is supposed here that the time during which a code group or a code element can be transmitted from the information source to the writer and the time during which the error signal can be transmitted from the checking circuit to the information source are negligible. If this is not the case the information source must repeat, as the case may be, $p+3$ or more code groups after the reception of the error signal. When the special delay line SVL receives the error signal, it transmits a number of pulses to the auxiliary writer HS equal to the number of code groups repeated by the information source, however, with a delay which corresponds to writing and reading of $q+1$ code groups, wherein $q$ denotes the number of code groups in the part of the information carrier between the reader L and the auxiliary writer HS. When the auxiliary writer receives a pulse from the special delay line SVL, it writes a special code group on the code group already recorded on the information carrier, which special code group contains the information "step further" for the further processing apparatus. If the information carrier is a punching tape, the special code group may be formed, for example, by punching holes at all code-element places. This special code group may be written on all code groups. The special code group may also consist in that a code-element place not having a hole in any of the further code groups has a hole in the special code group or conversely. With a view to checks performed by the further processing apparatus it is desirable if not necessary for the special code group to satisfy the checking characteristics. These may consist, for example, in that each significant code group should have an even (or an odd) number of holes. In FIGURE 1 it is supposed that the production of code groups by the informtion source IB, the writing on the information carrier by the writer S and the auxiliary writer HS and the reading of the code group on the information carrier by the reader L take place under the control of clock pulses supplied by a clock pulse generator KG (not shown), which pulses thus serve as transmitting pulses, writing pulses, reading pulses or progress pulses respectively. The instants of occurrence of these pulses may therefore be either reading instants, writing instants or progressing instants.

Figure 2:
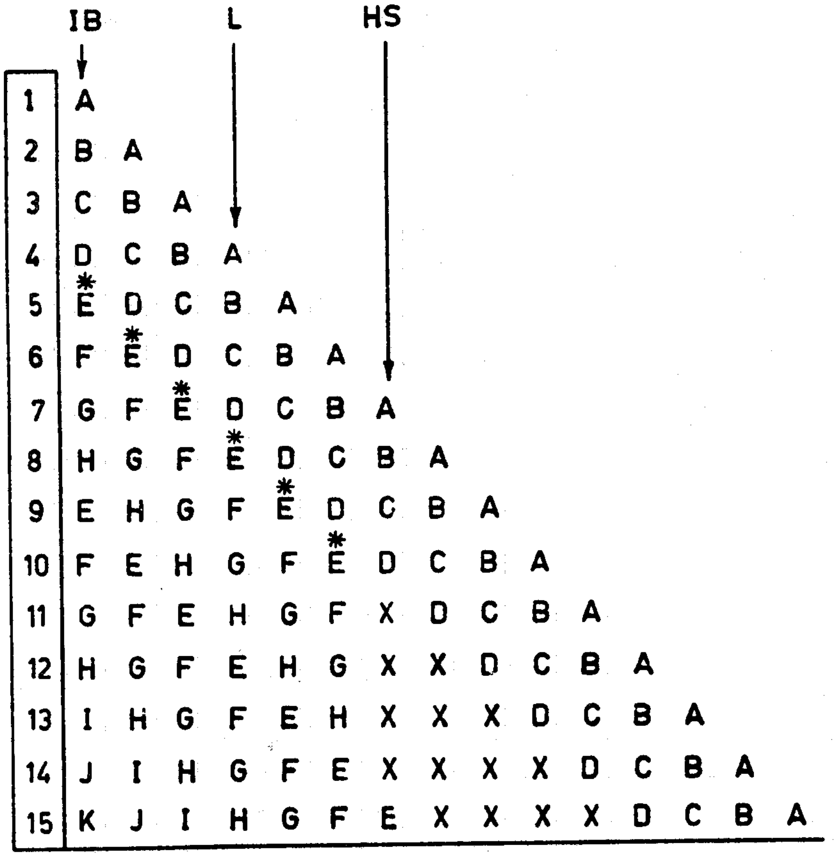
FIGURE 2 shows a diagram to explain the operation of the device of FIGURE 1.

The operation of the device shown in FIGURE 1 may be understood more clearly by the diagram of FIGURE 2. It is assumed here that between the writer S and the reader L and also between the reader L and the auxiliary writer HS two code groups are each time written on the information carrier (i.e. $p=q=2$). The information source IB supplies in order of succession the code groups A, B, C . . . . At the instant when the code group A passes by the reader L, the information source IB produces the code-group D occurring three code groups later and at the instant when the code group A passes by the auxiliary writer HS, the information source produces the code group G, occurring six code groups later (see the lines 4 and 7 of FIGURE 2); in the general case the digits 3 and 6 are to be replaced by $p+1$ and $p+q+2$. It will be supposed that the code group E is written in a mutilated form by the writer S on the information carrier. This is indicated in FIGURE 2 by the asterisk above the letter E. This is stated by the checking circuit CS, however, only when the mutilated code group passes through the reader L, at which instant the writer S receives the code group H from the information source IB (line 8). The checking circuit CS then transmits the error signal to the information source IB, which responds by repeating the mutilated code group E and the three subsequent code groups F, G and H. The mutilated code group E on the information carrier passes through the auxiliary writer HS at the instant when the writer S receives again the code group G (line 11). The auxiliary writer HS receives at this instant and at the three subsequent writing instants a pulse from the special delay line SVL and responds thereto by writing the special code group on the then passing code groups E, F, G and H, which special code group is indicated in FIGURE 2 by an "$x$."

Figure 3:
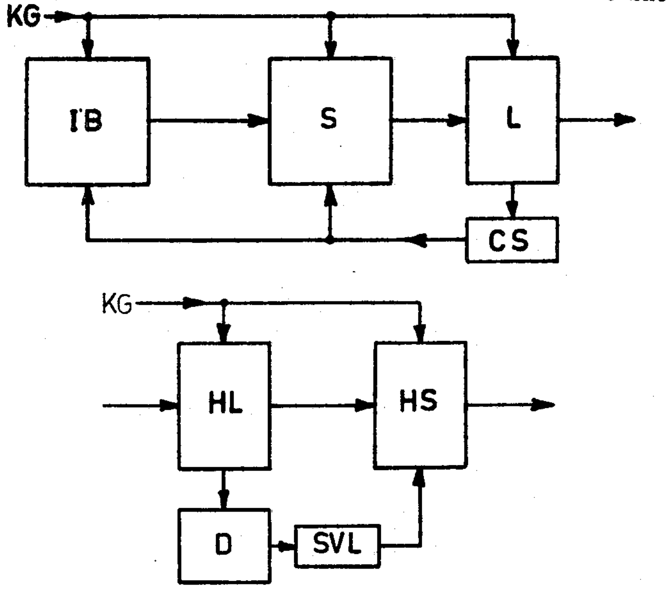
FIGURES 3 to 6 show the block diagrams of four further embodiments of the invention.

A different solution of the problem concerned is illustrated in FIGURE 3. The blocks IB, S, L and CS have the same functions or substantially the same functions as in FIGURE 1. The difference from FIGURE 1 consists in that the error signal produced by the checking circuit CS is fed to the information source IB and the writer S, whilst the auxiliary writer and the special delay line are omitted, at least from the top circuit of FIGURE 3. The information source IB responds to the reception of the error signal by skipping the transmisson of one code group and by repeating subsequently the last-transmitted $p+2$ code groups, wherein $p$ designates again the number of code groups in the part of the information carrier between the writer S and the reader L. The system comprising the members IB, S, L and CS therefore supplies an information carrier which may contain errors, but if this is true, it repeats the erroneous code group and the $p+1$ subsequent code groups, whilst immediately after the last repeated code group, in the example given consequently immediately after the code group H and hence also immediately before the first repeated code group (in this case the code group E) the special code group is written on the information carrier. When this code group is again designated by an "$x$" and an erroneous code group by an asterisk above the letter concerned, then the information carrier may contain, for example, the code groups (reading from right to left since the information is supposed to move from left to right):

$$. . . , L, K, J, I, H, G, F, E, x, H, G, F, \overset{*}{E}, D, C, B, A, \quad (01)$$

Figure 4:
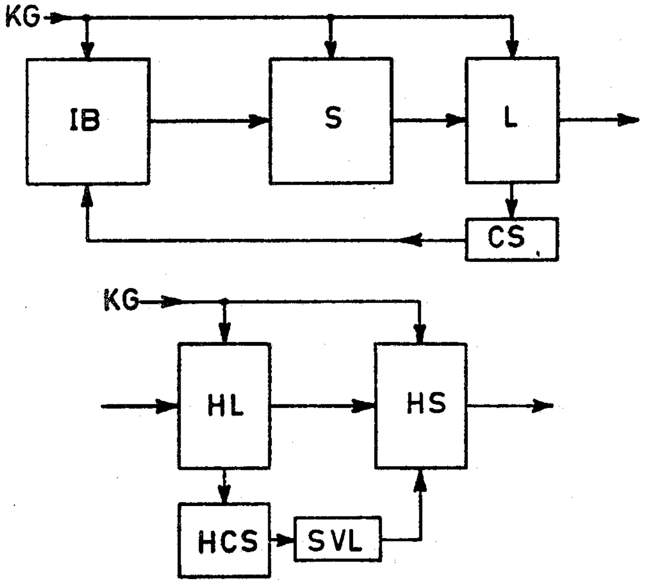

This information carrier with the repeated code groups H, G, F, $\overset{*}{E}$ of which the first $\overset{*}{E}$ is recorded erroneously in the information carrier, is passed in a reverse sense through an auxiliary reader HL and then through an auxiliary writer HS. The auxiliary reader HL and the auxiliary writer HS need not be synchronized with the information source IB, the writer S and the reader L. The auxiliary reader HL reads the code groups of the sequence (01), i.e. from left to right and reads the special code group $x$ at the beginning of a group of code groups (i.e. the code groups H, G, F, $\overset{*}{E}$), which are to be skipped. The auxiliary reader is connected to a detection circuit D, which detects the special code group $x$ and if this is the case, it supplies a pulse to the special delay line SVL, which transmits with a delay of $q+2$ writing instants, $p+2$ pulses to the auxiliary writer HS. The latter writes again the special code group $x$ on the $p+2$ code groups (i.e. the code groups, H, G, F, $\overset{*}{E}$) then passing by. The auxiliary writer thus supplies an information carrier having the code groups (again read from right to left):

$$A, B, C, D, x, x, x, x, x, x, E, F, G, H, I, J, K, L, . . . \quad (02)$$

so that the desired object is also attained. Of course, the assembly may be arranged so that the information source IB supplies the code groups in a reversed order, which groups are corrected in the correct order of succession by the auxiliary reader and the auxiliary writer. As an alternative, the detector D, which detects the special code group, may be replaced by an auxiliary checking circuit HCS of accurately the same type as the checking circuit of the embodiments of FIGURES 1 and 3. In this case it is not necessary for the writer S to write the special code group on the information carrier, so that in this case the writer need not receive the error signal (FIGURE 4). The information carrier must be passed in the same sense through the auxiliary reader HL and the auxiliary writer HS as it is supplied by the writer S.

Figure 5:
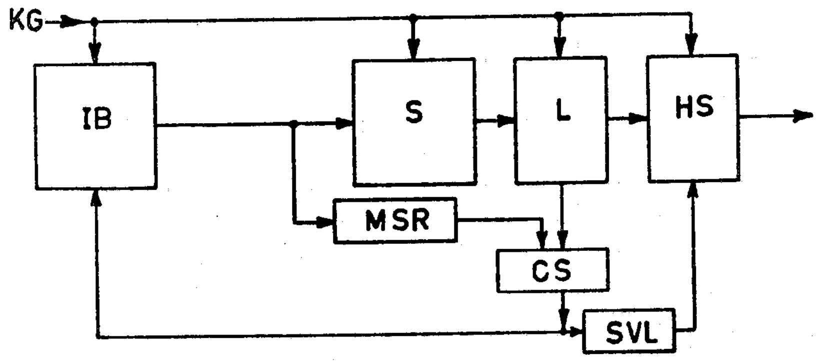
Figure 6:
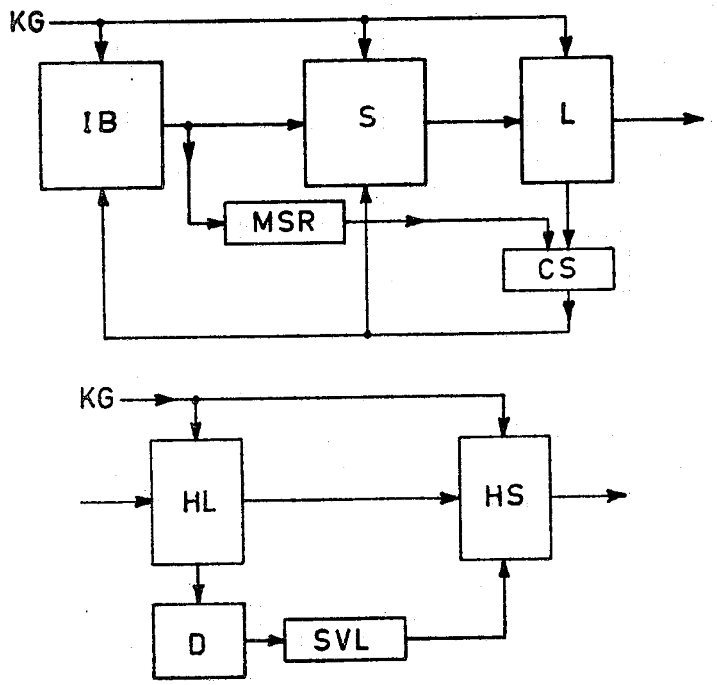

The solutions of the problem concerned described with reference to FIGURES 1, 3 and 4 have all the advantage that they check not only the correct functioning of the writer S but also whether or not the information concerned is supplied free of errors by the information source IB. However, these solutions have the disadvantages that they can be used only when a self-checking code is employed. FIGURE 5 shows the block diagram of a solution in which a non-self-checking code may be used, but in which only the correct function of the writer S is checked. Errors of the code groups supplied by the information source are therefore passed by unperceived. The difference from the device of FIGURE 1 consists in that the checking circuit CS receives not only the code groups read by the reader L, but via a multiple shift register MSR, also the code-groups supplied by the information source IB. The multiple shift register MSR serves to delay the code groups supplied by the information source IB to an extent such that the checking circuit CS always receives two identical code groups, if all is well. As soon as the writer S has made an error, the two code groups received at the same reading instant by the checking circuit are no longer identical, which is stated by the checking circuit, which is now, in fact, a comparison circuit. The error signal occurring with unequality stated by the checking circuit is used in the same manner as in the device shown in FIGURE 1. This solution may, of course, also be varied in the manner of the solutions described with reference to FIGURES 3 and 4, the information carrier emanating from the reader L being passed in the same sense or in the reverse sense through an auxiliary reader HL and an auxiliary writer HS, synchonized or not synchronized with the information source IB. Then the solution illustrated in FIGURE 6 is obtained, which need not be explained in detail after the foregoing description.

The parts of the system according to the invention are all of known structure or they can be built up from known parts by those skilled in the art. This applies particularly to the writer, the auxiliary writer and the reader. Though there is no special need for it, a description of a potential construction of electronic parts is given hereinafter. For the writer, the reader and the auxiliary writer commercially available apparatus may be used. The auxiliary writer may have even a simpler structure than the conventional writer, since it need write only a single code group on the information carrier.

Figure 7:
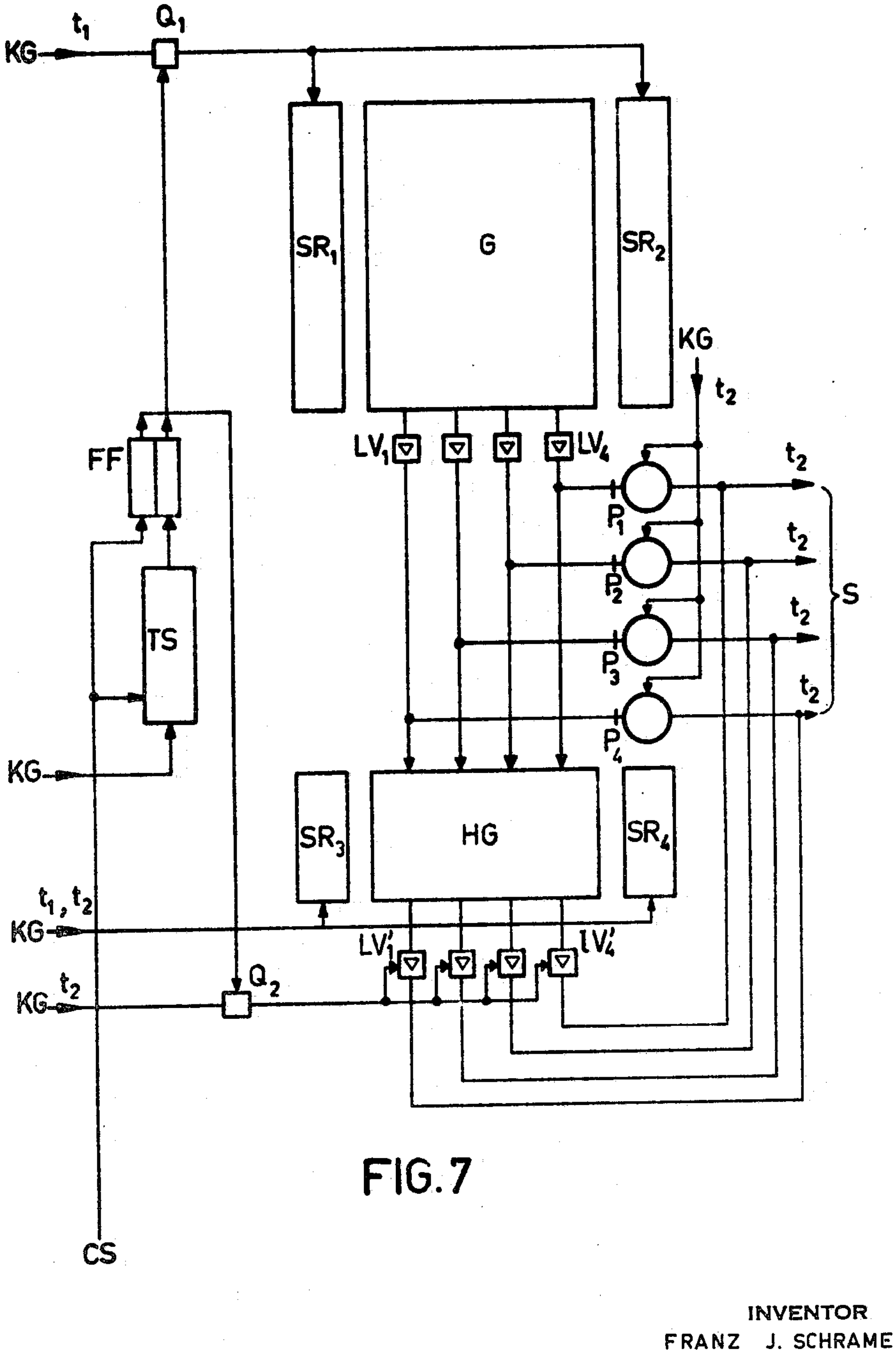
FIGURE 7 to 12 show the diagrams of details of parts of devices according to the invention.

FIGURE 7 illustrates a possible structure which may be employed for the information source. It comprises a storage G, in which the information to be transmitted is stored (for example a core storage), an auxiliary storage HG, four shift registers $SR_1$, $SR_2$, $SR_3$, $SR_4$, which control the storage G and the auxiliary storage HG. The arrangement comprises furthermore a flip-flop FF, a counting circuit TS, two gates $Q_1$, $Q_2$, four storing pulse generators $P_1$, $P_2$, $P_3$, $P_4$ and eight pulse amplifiers $LV_1$, . . . , $LV_4$, $LV_1'$, . . . , $LV_4'$. A strong pulse generator is to be understood to denote herein an arrangement comprising a cocking terminal (indicated in FIGURE 7 by a transverse bar on the line going through the said terminal), a firing terminal (indicated in FIGURE 7 by an arrow directed towards the said terminal), and an output terminal (indicated in FIGURE 7 by an arrow directed away from the said terminal). The pulse generator provides an output pulse only if first a pulse is fed to its cocking terminal (cocking of the pulse amplifier) and if then a pulse is fed to its firing terminal (firing of the pulse amplifier). The firing of a previously non-cocked pulse generator has therefore no effect. An arrangement having these properties is described, for example, in United States Patent No. 2,729,808.

The information source of FIGURE 7 operates as follows. Normally the flip-flop FF occupies the position in which the gate $Q_1$ is open and the gate $Q_2$ is closed. The shift registers $SR_1$ and $SR_2$ then receive at the instant $t_1$ of the pulse cycles pulses from the clock pulse generator KG (not shown in the figure) and the storage G transmits in parallel the code groups stored therein in known manner. Thus at the instant $t_1$ of each pulse cycle a code group is transmitted to the auxiliary storage HG and to the four pulse generators $P_1$, $P_2$, $P_3$, $P_4$. At the instant $t_2$ of each pulse cycle the pulse generators $P_1$, $P_2$, $P_3$, $P_4$ are fired, so that the pulse code group concerned is transmitted to the writer S. Since the gate $Q_2$ is closed, the pulse amplifiers $LV_1'$, . . . , $LV_4'$ do not receive pulses from the clock pulse generator and therefore these pulse amplifiers remain insensitive and do not allow the pulses emitted by the auxiliary storage HG to pass. However, when the information source receives a pulse from the checking circuit CS, the flip-flop FF jumps into the other state, so that the gate $Q_1$ is closed and the gate $Q_2$ is opened. The reading amplifiers $LV_1'$ . . . $LV_4'$ then receive at the instant $t_2$ of each pulse cycle a pulse from the clock pulse generator KG, so that at these instants they are sensitive and the pulse code groups supplied by the auxiliary storage HG are transmitted, subsequent to amplification, to the writer S. Since the gate $Q_1$ is closed, the shift registers $SR_1$ and $SR_2$ do no longer receive clock pulses, so that they stand still. As a result thereof, the storage G does no longer transmit information. The shift register $SR_3$ and $SR_4$ have to control the auxiliary storage HG so that at each instant $t_2$ the code group is transmitted, which is received at the instant $t_1$ of the pulse cycle occurring four pulse cycles earlier from the storage G. The pulse supplied by the checking circuit CS is, in addition, fed to a counting circuit TS, fed by the clock pulse generator KG. This counting circuit is arranged so that, subsequent to the reception of a pulse from the checking circuit, it supplies a pulse four pulse cycles later, which pulse is used to return the flip-flop FF to its initial position, so that the information source resumes the normal transmission of code groups from the storage G, starting where it had stopped. It is further more efficacious to arrange the counting circuit TS so that it jumps back into the initial position, when it receives pulse from the checking circuit before it has responded by an output pulse to the preceding pulse from the checking circuit.

Figure 8:
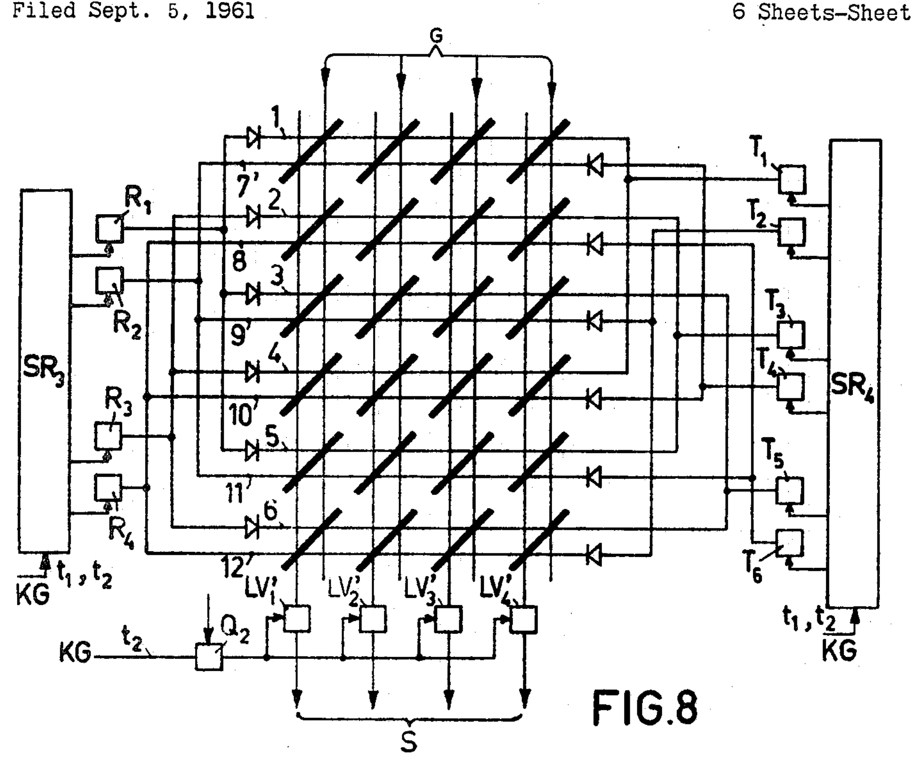

FIGURE 8 shows the arrangement of the auxiliary storage HG and the control thereof by the shift registers $SR_3$ and $SR_4$. The storage proper consists of six rows of four rings each, made from a material having a rectangular hysteresis loop, these rows being written by coincidence in known manner and are read in parallel line after line. The shift register $SR_3$ controls the gates $R_i$ ($i$ is 1, 2, 3, 4,) so that they are opened in the order of succession $R_1$, $R_2$, $R_3$, $R_4$, $R_1$, $R_2$, . . . each time for the duration of just one pulse. The gates $R_1$ and $R_3$ are open only at the instant $t_1$, the gates $R_2$ and $R_4$ only at the instant $t_2$. Similarly the shift register $SR_4$ opens the gates $T_j$ ($j$ is 1, 2, . . . 6) in the order of succession: $T_1$, $T_2$, $T_3$, $T_4$, $T_5$, $T_6$, $T_1$, $T_2$, . . . , the gates $T_1$, $T_3$, $T_5$ being open only at the instant $t_1$ and the gates $T_2$, $T_4$, $T_6$ only at the instant $t_2$. The gates $R_i$ and $T_j$ are connected to wires 1, 2, . . . 12 taken through the rings and provided with decoupling diodes so that at the instant $t_1$ of each pulse cycle the pulse code group supplied by the storage G is written by coincidence in a row of rings, whereas at the instant $t_2$ of each pulse cycle the row of rings written four pulse cycles earlier is written. It is supposed, by way of example, that at the instant $t_1$ of a pulse cycle simultaneously the gates $R_1$ and $T_3$ are open. Then a current passes through the wire 5 and the sense and magnitude of this current are chosen so that at this instant the fifth row of rings has written in it by coincidence the pulse code group supplied by the storage G. At the instant $t_2$ of the same pulse cycle the gates $R_2$ and $T_4$ are simultaneously open and a current passes through the wire 1. The sense and the magnitude of this current are chosen so that the first row of rings is read by it. At the instant $t_1$ of the next-following pulse cycle the gates $R_3$ and $T_5$ are simultaneously open, so that a current passes through the wire 6 and the sixth row of rings is written by coincidence. At the subsequent instant $t_2$ the gates $R_4$ and $T_6$ are simultaneously open, so that c current flows through the wire 6 and the second row of rings is read, and so forth. The auxiliary storage HG transmits the received code groups consequently with a delay of four pulse cycles.

Figure 9:
Figure 10:
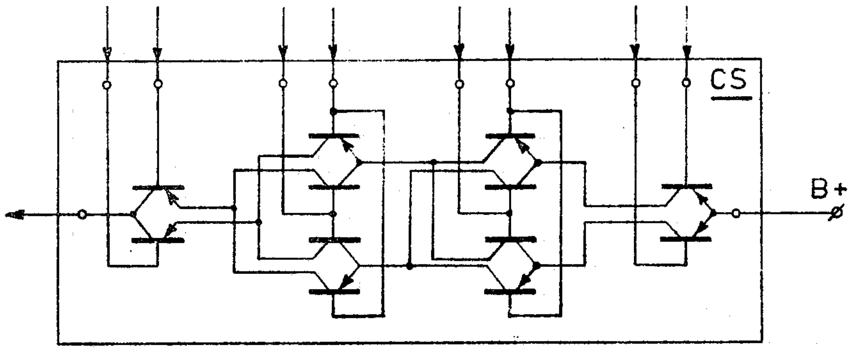

The checking circuit must be capable of assessing the parity of the pulse code groups. This may be achieved by means of a so-called two-way circuitry, of which the principle is shown in FIGURE 9 and of which FIGURE 10 illustrates the diagram of an electronic embodiment. The two change-over switches at the ends of the chain of switches are formed here by two transistors each, the two bipolar commutators are formed by four transistors each.

Figure 11:
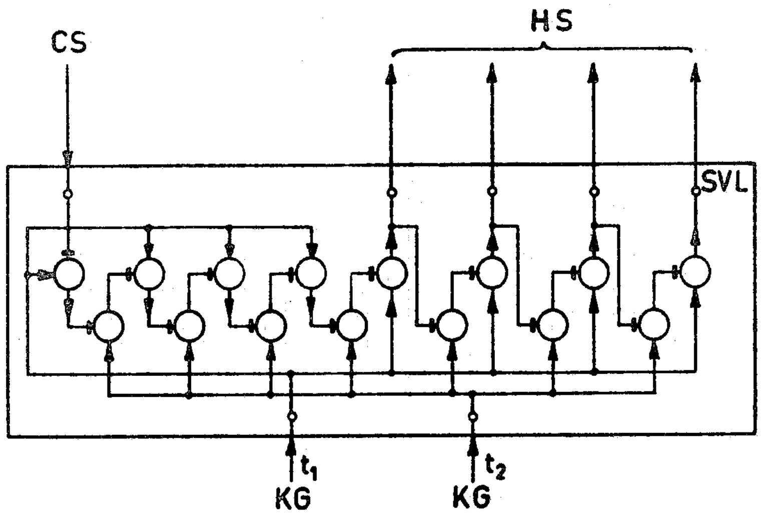

FIGURE 11 shows a potential embodiment of the special delay line SVL. It comprises a chain of 15 storing pulse generators, of which the first is cocked by a pulse supplied by the checking circuit and of which each of the further generators is cocked by the output pulse of the preceding storing pulse generator. The odd-numbered pulse generators are fired at the instant $t_1$ of each pulse cycle by a pulse supplied by the clock pulse generator KG and the even-numbered pulse generators are fired at the instant $t_2$ of each pulse cycle by a pulse supplied by the clock pulse generator. The ninth, eleventh, thirteenth and fifteenth pulse generators supply the pulses fed to the auxiliary writer. The delay line operates on the principle of the so-called "Wang line."

Figure 12:
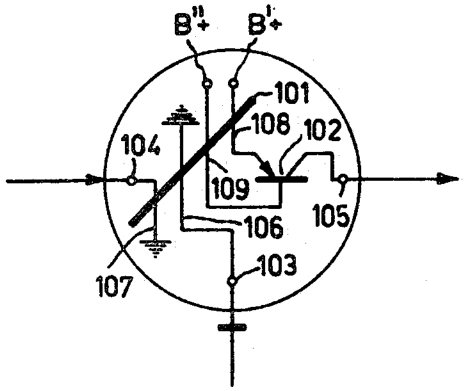

Finally FIGURE 12 shows the diagram of a potential embodiment of the storing pulse generators, illustrated in the conventional symbol. In this figure 101 designates a ring of a material having a rectangular magnetic hysteresis loop, 102 a pnp-transistor, 103 the cocking terminal, 104 the firing terminal, 105 the output terminal, 106 a cocking winding connected to the cocking terminal of the ring 101, 107 a firing winding of the ring 101 connected to the firing terminal, 108 a feedback winding of the ring 101, connected on the one hand to a positive voltage source $B_+'$ and on the other hand to the emitter of the transistor 102, and 109 a control-winding connected on the one hand to a second positive voltage source $B_+''$, which may coincide with the first voltage source, and on the other hand to the base of the transistor 102. The collector of the transistor 102 is connected to the output terminal 15. The voltages of the voltage sources $B_+'$ and $B_+''$ are chosen so that the transistor 102 is normally non-conducting.

The arrangement operates as follows. It is supposed that a current pulse is fed to the cocking terminal 103. The ring 101 is brought into a magnetic state which is termed the state 1. When the ring 101 is in this state, the pulse generator is cocked. When a pulse is then fed to the firing terminal 104, the ring 101 starts going back into the state 0, so that a voltage is induced into the control-winding 109, which voltage renders negative the base of the transistor 102 with respect to the emitter. The transistor thus becomes conducting and the pulse generator supplies an output pulse. The current then passing through the feedback winding 108 contributes to the effect of the firing pulse and is even capable of taking this function over when the firing pulse has terminated, before the ring 101 has reached the state 1. By a suitable proportioning it may be ensured that the output pulse has a sharply defined duration and amplitude, which magnitudes are substantially independent of the nature of the firing terminal. It is otherwise obvious that the pulse generator may be provided with two or more firing terminals, connected to separate firing windings or two or more cocking terminals connected to separate cocking windings. The assembly is to be arranged so that the pulse generator can be brought into the cocked state only by applying simultaneously a cocking pulse to two cocking terminals (cocking in coincidence).

What is claimed is:

1. A data transmission system comprising an information carrier, means for writing information on said carrier, a source of coded information signal groups, means for transmitting said signal groups to said writing means, a reader for reading information from said information carrier, checking circuit means connected to said reader for detecting errors in the signals read by said reader, means connecting said checking circuit means to said source, said source comprising means for repeating at least $p+2$ of said information signal groups upon detecting of an error by said checking circuit means, wherein $p$ is the number of signal groups on said information carrier between said writing means and said reader, auxiliary reader means, auxiliary checking circuit means connected to said auxiliary reader means, auxiliary writing means, delay means connecting said auxiliary checking circuit means to said auxiliary writing means, and means directing said information carrier from said reader to said auxiliary reader and auxiliary writing means in that order, whereby synchronization between said sources, reader and writing means and said auxiliary writing means and auxiliary reader is not necessary.

2. The system of claim 1 in which said checking circuit means is connected to said writing means, whereby said writing means indicates errors on said carrier in response to detection thereof by said checking circuit means, said auxiliary checking circuit means comprising means for detecting the errors on said carrier indicated by said writing means.

3. The system of claim 2 comprising means for passing the information groups on said carrier in one direction through said writing means and reader and in the opposite direction through said auxiliary reader and writing means.

4. A data transmission system comprising an information carrier, means for writing information on said carrier, a source of coded information signal groups, means for transmitting said signal groups to said writing means, a reader for reading information from said information carrier, checking circuit means connected to said reader for detecting errors in the signals read by said reader, means connecting said checking circuit means to said source, said source comprising means for repeating at least $p+2$ of said information signal groups upon detection of an error by said checking circuit means, wherein $p$ is the number of signal groups on said information carrier betwen said writing means and said reader, auxiliary writing means, means for passing said information carrier to said auxiliary writing means after it has passed said reader, and means connecting said checking circuit means to said auxiliary writing means, said auxiliary writing means comprising means for writing information on said information carrier indicatng the detecting of an error by said checking circuit means, said means connecting said checking circuit means to said auxiliary writing means comprising delay circuit means for delaying signals from said checking circuit means at least $q+1$ writing instants, wherein $q$ is the number of code groups on said information carrier between said reader and said auxiliary writing means, said checking circuit means comprising means for transmitting at least $p+q$ signals whereby each information signal group on said carrier that has an error and at least the next $p+q-1$ signal groups on said carrier are indicated by a special code group by said auxiliary writing means.

5. A data transmission system comprising an information carrier, means for writing information on said carrier, a source of coded information signal groups, means for transmitting said signal groups to said writing means, a reader for reading information on said information carrier, checking circuit means connected to said reader for detecting errors in the signals read by said reader, means connecting said checking circuit means to said source, said source comprising means for repeating at least $p+2$ of said information signal groups upon detection of an error by said checking circuit means, wherein $p$ is the number of signal groups on said information carrier between said writing means and said reader, auxiliary writing means, means for passing said information carrier to said auxiliary writing means after it has passed said reader, means connecting said checking circuit means to said auxiliary writing means, said auxiliary writing means comprising means for writing information on said information carrier indicating the detection of an error by said checking circuit means, and delay circuit means connected between the input of said writing means and said checking circuit means, said checking circuit means comprising means for comparing the output of said reader with the input of said writing means.

References Cited by the Examiner

UNITED STATES PATENTS

| | | | |
|---|---|---|---|
| 2,235,755 | 3/1941 | Bakker et al. | 178—23.1 |
| 2,813,259 | 11/1957 | Burkhart | 340—174.1 X |
| 2,828,362 | 3/1958 | Darwin et al. | 178—23.1 X |
| 2,975,407 | 3/1961 | O'Brien | 340—174.1 |
| 2,985,714 | 5/1961 | Barbeau et al. | 178—23.1 |
| 3,096,511 | 7/1963 | Taras | 340—146.1 X |

ROBERT C. BAILEY, *Primary Examiner.*

MALCOLM A. MORRISON, *Examiner.*